United States Patent Office 2,930,717
Patented Mar. 29, 1960

2,930,717

NON-BLOCKING PELLICLE AND METHOD FOR MAKING THE SAME

Edward J. Dunn, Claymont, Del., assignor to American Viscose Corporation, Philadelphia, Pa., a corporation of Delaware No Drawing. Application February 1, 1957
Serial No. 637,614

14 Claims. (Cl. 117—145)

This invention relates to improvements in smooth non-fibrous pellicles and more particularly to treating water-insoluble, hydrophilic non-fibrous cellulosic pellicles with a water-soluble salt of a siliconic acid to impart anti-block properties to the pellicles.

The term "pellicle" as used herein is defined as a film, sheet, or similar article having a thickness of from about 0.0001 to about 1/16 of an inch.

Materials that comprise the non-fibrous water-insoluble cellulosic pellicles contemplated by this invention include regenerated cellulose and water sensitive but water-insoluble low-substituted cellulose derivatives such as glycerol cellulose, methyl cellulose, ethy celluose, cellulose glycollic acid, hydroxyethyl cellulose and cellulose phthalic acid. These pellicles, when made of regenerated cellulose, are commonly known as cellophane.

Cellulosic pellicles contemplated by this invention have satisfactory pliability when their moisture content is approximately from 5 to 10% by weight. Under conditions of normal relative humidity these pellicles will absorb enough moisture from the atmosphere to be pliable, but to insure pliability in an atmosphere of low relative humidity sufficient quantities of hygroscopic plasticizing material are incorporated into the pellicle to maintain a minimum moisture content of about 5%. Examples of hygroscopic materials which may be used for this purpose are polyhydric alcohols such as glycerol, glycol, propylene glycol and sorbitol, urea, urea-ethylene oxide condensation products having 1 to 40 ethylene oxide units per molecule, thiourea, calcium chloride, lithium chloride, sodium acetate, sucrose and mixtures of two or more such compounds.

A non-fibrous cellulosic pellicle impregnated with a hygroscopic agent, however, tends to block, i.e., form a laminate whose layers are difficult to separate when several layers of the treated pellicle are superimposed. This characteristic is especially disadvantageous when the pellicles are stored are stored in rolls or stacked sheets.

Numerous sizing compositions including sodium silicate and colloidal silica have been proposed to impart anti-blocking properties to non-fibrous cellulosic pellicles but prior art proposals have not been completely satisfactory. Silicates and silica, for example, must be applied in colloidal suspensions which are difficult to control. Moreover, such anti-blocking agents do not impart slip properties that adequately reduce the telescoping tendencies of the pellicles in rolls.

It has now been discovered that plasticized pellicles, having excellent non-blocking properties and slip characteristics such that telescoping tendencies when in rolls is adequately reduced, can be obtained by treating the surface of the cellulosic pellicles with a dilute solution of certain alkali metal and alkaline earth metal water soluble salts of alkane orthosiliconic acids. These alkane orthosiliconates have the following probable structural formula in dilute wter solutions:

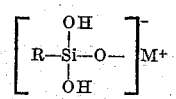

wherein R is a hydrocarbon radical having from one to six carbon atoms in the molecular chain such as methyl, ethyl, isopropyl, cyclohexyl or phenyl, and M is an alkali metal such as lithium, sodium or potassium or an alkaline earth metal such as calcium, barium or strontium.

Though the term alkane orthosiliconate is used in accordance with the formula given, it may be that the silica compound is present, to at least some degree, with the metal in the form of the alkane siliconate in accordance with the formula

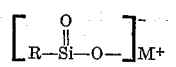

the two formulas differing only in the degree of hydration that may be present and representing chemically equivalent compounds. However, it should be understood that even though the formula

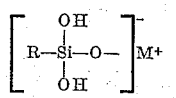

is given as the probable formula and used for illustrating and determining the concentrations used, the invention is not limited to the alkane silicane compound necessarily being present in this particular form.

Solutions of the above described metal alkane orthosiliconates may be prepared, for example, by first hydrolyzing a monohydrocarbon-substituted silicane containing three hydrolyzable radicals having the formula

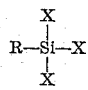

wherein R is a hydrocarbon radical as defined above and X is a hydrolyzable group such as a chlorine atom, and then dissolving the precipitated hydrolysis product in a water solution of a base of an alkali or alkaline earth metal. The ratio of base in the solution to the hydrolysis product should be such that there is at least one atom of base metal to each silicon atom. The foregoing method, outlined above for preparing the alkali metal or alkaline earth metal alkane orthosiliconates, is set forth in detail by Kipping and Meads in Journal of the Chemical Society, 105, 679 (1914).

It is indeed surprising that these alkane orthosiliconates can be used for rendering cellulose pellicles non-blocking while not interfering with their absorption of moisture when it is considered that these compounds have heretofore been used for treating fabrics to render the same water-repellent as described in United States Patent No. 2,507,200 of May 9, 1956. However, cellulosic pellicles plasticized with a hygroscopic material are readily wetted with water after being rendered non-blocking by treatment with solutions of the metal alkane orthosiliconates regardless of whether the plasticizing is done prior to or after such treatment or whether the plasticizer is included in the solution of metal alkane orthosiliconate. Not only are the treated surfaces readily wetted with water but they appear to give a substantially better bond with other coatings. Also, after drying, the deposited alkane orthosiliconate, or polyalkane siliconic acid which is probably formed on drying the treated pellicles, will not wash out. This is important where the cellophane may be used for wrapping moist food products such as fresh moist meat.

In practicing the present invention it is necessary that the concentration of the alkane orthosiliconate in the treating solution not be too great as, in too strong concentration, it has a brittling effect on the cellulose pellicle being treated. Since one of the main purposes for including the hygroscopic plasticizing material is to insure pliability, it is readily understood that concentrations of the metal alkane orthosiliconate in the treating solution sufficiently high to cause brittling should be avoided. For example 0.3 molar aqueous solutions of the alkane orthosiliconates will cause substantial brittling of the treated cellulose pellicle. It has been found that in order to avoid this detrimental brittling of the treated pellicle the concentration of the treating solution should not exceed about 0.17 molar solution with respect to the alkane orthosiliconate. Solution concentrations as low as 0.008 molar with respect to the alkane orthosiliconate may also be used. The best results, however, are generally obtained by using solutions having concentrations of 0.03 to 0.08 molar with respect to the metal alkane orthosiliconate. Throughout the specification and claims all values for concentration of metal alkane orthosiliconate given are based on the formula

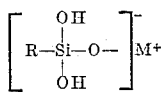

previously referred to.

In accordance with this invention, it is preferred to immerse the pellicles in an aqueous solution of the siliconates while in the gel state, i.e., in a liquid saturated condition before a hardened film is formed as the result of the first drying or substantial loss of liquid after being formed by extrusion into a liquid coagulating bath. The treating solution may also be applied by other methods such as by means of coating rolls, spraying, or the like. The pellicles are preferably immersed for a period of time sufficient to allow the liquid in the gel and the bath to reach a practical equilibrium. The preferred minimum period is about 10 seconds but pellicles immersed up to 5 minutes will have substantially the same properties as those treated for a shorter time. It is generally preferred to incorporate the metal alkane orthosiliconates specified above in the plasticizing bath so as to plasticize the pellicle and render the same non-blocking with a single treatment. However, separate solutions can be used if desired. Plasticizing baths generally used comprise solutions of hygroscopic materials described hereinabove wherein the concentrations of the hygroscopic materials are from 2 to 15% by weight of the plasticizing bath. The alkane orthosiliconates may be applied in a separate bath; the treated film being thereafter dried, and then immersed in a plasticizing bath. However, in such a case, the concentration of the plasticizer is generally doubled in under to obtain the equivalent amount of plasticizer pick-up. Also, plasticized dried pellicles may be rendered non-blocking by treatment with aqueous solutions of the alkane orthosiliconates in the concentrations described. However, as previously stated, treatment of the pellicle in the gel state is preferred. A separate bath is preferably employed to prevent precipitation of the siliconate where an acidic plasticizing bath is used. The resulting pellicles, which are hydrophilic in the sense that they will absorb moisture and can be readily wetted, show no tendency to block, and do not readily telescope when in rolls as illustrated by the examples hereinafter given.

After immersion in the alkane orthosiliconate solution, excess liquid is removed from the cellulosic pellicle, e.g., by a pair of squeeze rolls or wiper blades. If the treated pellicle is once dried, subsequent immersion or wetting will not wash out the salt. Though the actual reaction mechanism is not known, it is believed that the alkane orthosiliconate, on drying, forms an insoluble polyalkane siliconic acid which may, in part, have reacted with the cellulosic material being treated. However, whatever the reaction, the treated pellicles readily absorb moisture so that the incorporated hygroscopic plasticizing materials maintain the required moisture content in the pellicles to assure pliability and the surface of the treated pellicles is readily wet with water. In the present invention, this insoluble state is preferably formed merely by drying the treated pellicle in air. The pellicle may be dried in a heated atmosphere to shorten this drying time. The amount of alkane siliconic acid condensation product that remains suffused in pellicles treated in accordance with the method of this invention will vary from about 0.2 to about 8% of the total weight of the pellicle depending on the concentration of alkane orthosiliconate in the treating bath. It is preferred that the pellicles also contain from 5 to 30% by weight of hygroscopic plasticizing materials. Specific quantities of the suffused siliconic material for given concentrations in the bath are set forth in the examples to follow.

The following examples are illustrative of this invention and represent preferred embodiments thereof.

*Example 1*

A regenerated cellulose pellicle (0.001 inch thick) in the gel state was immersed in an aqueous bath containing 5% by weight of glycerol and 0.4% by weight of sodium methyl-orthosiliconate (about 0.034 molar) for 30 seconds. Excess liquid was removed with wiper blades. The pellicle was dried in an oven at 90° C. for 3 hours and then placed in a conditioned atmosphere used to give uniform experimental conditions. The treated pellicle contained 1.2% by weight of condensation product. The following test was conducted to observe the anti-blocking properties of the treated pellicle. The pellicle was cut, while in the conditioned atmosphere, into sheets 4 inches by 4 inches, 10 of which were stacked together and wrapped in a moistureproof wrapping to prevent loss of moisture on heating. The stacked sheets were then subjected to a pressure of ⅓ pound per square inch while heated in an oven at 115° F. for 16 hours. Thereafter, the individual sheets of the stack were easily separated with no observed tendency to block. Rolls of this film also showed no tendency to telescope.

*Example 2*

A regenerated cellulose pellicle (0.0016 inch thick) in the gel state was immersed in an aqueous bath containing 5% by weight of glycerol and 1.0% by weight of sodium ethyl orthosiliconate (about 0.077 molar) for 1 minute. Excess liquid was removed and the pellicle dried in an oven at 85° C. for 3 hours. The pellicle contained 4.3% by weight of condensation product. The test for anti-block properties was performed in the same manner as in Example 1. The individual sheets tested were easily separated. There was no observed tendency of the treated pellicle to telescope when wound into rolls.

*Example 3*

A regenerated cellulose pellicle (0.0009 inch thick) in the gel state was immersed in a bath containing 3% by weight of glycerol, 2% by weight of urea and 2.0% by weight of potassium isopropyl orthosiliconate (about 0.14 molar) for 10 seconds. Excess liquid was removed and the pellicle dried in an oven at 80° C. for 4 hours. 7% by weight of the pellicle was suffused condensation product. The same test to observe the anti-blocking properties of this treated pellicle was conducted as in Example 1 and the stack of sheets separated easily after the specified heat and pressure had been applied. Rolls of this material were wound on spools having a diameter of 2 inches. After a 6-inch layer of the pellicle was built up, the roll did not telescope without applying external force.

Example 4

A gel film or pellicle 0.0009 inch thick was immersed for one minute in an aqueous bath containing 4.5% by weight glycerol and 0.4% by weight (0.034 molar) sodium methyl orthosiliconate. The film was then removed from the bath and passed through a wringer to remove excess treating solution after which it was dried by standing over night at room temperature (about 75° F.). The film was then tested by the method described in Example 1 for anti-blocking properties. The individual sheets tested were easily separated. Rolls of film, treated in the above manner, also showed no tendency to telescope.

Cellulose pellicles treated according to this invention are useful packaging sheets or wrappers and are especially valuable because of their anti-blocking and slip properties. The process of this invention has the advantage of employing a water-soluble siliconic material which is compatible with hygroscopic materials commonly used as plasticizers for cellophane. As a result, by practicing the present invention, cellophane can be rendered non-blocking while being plasticized by merely adding the metal alkane orthosiliconate, in the concentrations specified, to the plasticizing baths which are employed in the manufacture of cellophane.

It is to be understood that changes and variations may be made in the foregoing examples without departing from the spirit and scope of the invention as defined by the appended claims.

This application is a continuation in part of my application Serial No. 397,030, filed December 8, 1953, now abandoned.

Having thus described my invention, I claim:

1. A method of preparing non-blocking non-fibrous cellulosic pellicles having improved slip characteristics comprising treating said pellicles with an aqueous solution containing 2 to 15% by weight of a hygroscopic plasticizing material and a 0.008 to 0.17 molar aqueous solution of a metal salt of an alkane orthosiliconate represented by the formula

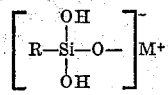

wherein R is a hydrocarbon radical containing 1 to 6 carbon atoms and M is an ion of a metal selected from the group consisting of alkali metals and alkaline earth metals, and drying said pellicles, the time of treatment being such that said pellicles contain 0.2 to 8% by weight of said siliconate after being treated and dried and 5 to 30% by weight of said plasticizer after being treated and dried.

2. The method of claim 1 wherein said pellicles are treated while in the gel state.

3. The method of claim 1 wherein said hygroscopic plasticizer is glycerol.

4. The method of claim 1 wherein said metal salt of said alkane orthosiliconate is sodium methyl orthosiliconate.

5. A method of preparing a non-fibrous non-blocking cellulosic pellicle having improved slip characteristics comprising immersing said pellicle while it is in the wet gel state for a period of time of from 10 seconds to 5 minutes in an aqueous solution containing 2 to 15% by weight of a hygroscopic plasticizer and having a 0.03 to 0.08 molar concentration of a metal salt of an alkane orthosiliconate represented by the formula

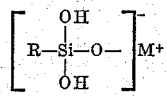

wherein R is a hydrocarbon radical having 1 to 6 carbon atoms and M is an ion of a metal selected from the group consisting of alkali metals and alkaline earth metals.

6. The method of claim 5 wherein said alkane orthosiliconate metal salt is a sodium alkane orthosiliconate.

7. The method of claim 5 wherein said hygroscopic plasticizer is glycerol.

8. The method of claim 7 wherein said alkane orthosiliconate metal salt is sodium methyl orthosiliconate.

9. The method of claim 7 wherein said alkane orthosiliconate metal salt is sodium ethyl orthosiliconate.

10. The method of claim 7 wherein said alkane orthosiliconate metal salt is potassium isopropoyl orthosiliconate.

11. A non-blocking, non-fibrous, water-insoluble hydrophilic cellulosic pellicle containing 5 to 30% by weight of a hygroscopic plasticizer and 0.2 to 8% by weight of a water-insoluble polymerized organic silicon compound an aqueous solution of which has the formula

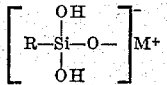

wherein R is a hydrocarbon radical having 1 to 6 carbon atoms and M is an ion of a metal selected from the group consisting of alkali and alkaline earth metals.

12. The product of claim 11 wherein said hygroscopic plasticizer is at least one of the group consisting of glycerol, glycol, propylene glycol, sorbitol, urea, urea-ethylene oxide condensation products having 1 to 40 ethylene oxide units per molecule, thiourea, calcium chloride, lithium chloride, sodium acetate and sucrose.

13. The product of claim 12 wherein said hygroscopic plasticizer is glycerol.

14. The product of claim 13 wherein said organic silicon compound in an aqueous solution is a methyl orthosiliconate metal salt, the cation of which is selected from the group consisting of alkali metals and alkaline earth metals.

References Cited in the file of this patent

UNITED STATES PATENTS

| 2,087,008 | Snyder | July 13, 1937 |
| 2,412,470 | Norton | Dec. 10, 1946 |
| 2,507,200 | Elliott et al. | May 9, 1950 |
| 2,658,843 | Brillhart | Nov. 10, 1953 |

OTHER REFERENCES

McGregor: "Silicones and Their Uses," 1954, pages 215 and 216. "Silicones and Their Uses," 1954, pages 199–219.